United States Patent
Kamio

(10) Patent No.: US 11,624,438 B2
(45) Date of Patent: Apr. 11, 2023

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 154 days.

(21) Appl. No.: 16/930,671

(22) Filed: Jul. 16, 2020

(65) Prior Publication Data

US 2020/0347930 A1 Nov. 5, 2020

Related U.S. Application Data

(63) Continuation of application No. PCT/JP2018/046557, filed on Dec. 18, 2018.

(30) Foreign Application Priority Data

Jan. 19, 2018 (JP) .............................. JP2018-007010

(51) Int. Cl.
*F16H 61/12* (2010.01)
*F16H 61/32* (2006.01)
*H02P 6/12* (2006.01)
*H02P 6/16* (2016.01)

(52) U.S. Cl.
CPC ............. *F16H 61/12* (2013.01); *F16H 61/32* (2013.01); *H02P 6/12* (2013.01); *H02P 6/16* (2013.01); *F16H 2061/1224* (2013.01); *F16H 2061/1284* (2013.01); *F16H 2061/326* (2013.01)

(58) Field of Classification Search
CPC .. F16H 61/12; F16H 61/32; F16H 2061/1224; F16H 2061/1284; F16H 2061/326; F16H 59/105; F16H 59/66; H02P 6/12; H02P 6/16; H02P 29/024
See application file for complete search history.

(56) References Cited

U.S. PATENT DOCUMENTS

| | | | |
|---|---|---|---|
| 2002/0019287 A1* | 2/2002 | Ebashi | F16H 61/32 475/254 |
| 2003/0135314 A1* | 7/2003 | Saito | G01D 11/245 701/69 |
| 2005/0146302 A1* | 7/2005 | Kamio | G05B 9/03 318/647 |

(Continued)

FOREIGN PATENT DOCUMENTS

JP 2013-194750 9/2013

*Primary Examiner* — Bickey Dhakal
(74) *Attorney, Agent, or Firm* — Nixon & Vanderhye P.C.

(57) ABSTRACT

A motor angle calculation unit acquires from a motor rotation angle sensor a motor rotation angle signal corresponding to a rotational position of the motor, and calculates a motor angle based on the motor rotation angle signal. An output shaft signal acquisition unit acquires, from an output shaft sensor that detects a rotational position of an output shaft, an output shaft signal corresponding to the rotational position of an output shaft. An abnormality determination unit determines abnormality in the output shaft sensor. A target angle setting unit sets a target rotation angle corresponding to a target shift range. A drive control unit controls driving of the motor so that the motor angle becomes a target rotation angle. The target angle setting unit sets the target rotation angle to different values when the output shaft sensor is normal and when the output shaft sensor is abnormal.

16 Claims, 6 Drawing Sheets

(56) References Cited

U.S. PATENT DOCUMENTS

| | | | | |
|---|---|---|---|---|
| 2005/0160849 | A1* | 7/2005 | Kozu | F16H 61/24 |
| | | | | 74/335 |
| 2005/0174084 | A1* | 8/2005 | Nakai | F16H 61/32 |
| | | | | 318/632 |
| 2006/0207373 | A1* | 9/2006 | Amamiya | F16H 61/32 |
| | | | | 74/473.36 |
| 2006/0276300 | A1* | 12/2006 | Kashiwagi | F16H 61/32 |
| | | | | 477/34 |
| 2009/0171544 | A1* | 7/2009 | Tanaka | F16H 61/32 |
| | | | | 701/55 |
| 2009/0292431 | A1* | 11/2009 | Hoshino | F16H 61/12 |
| | | | | 701/62 |
| 2010/0161187 | A1* | 6/2010 | Ito | F16H 61/32 |
| | | | | 701/58 |
| 2011/0246033 | A1* | 10/2011 | Vernacchia | F16H 61/2807 |
| | | | | 74/473.1 |
| 2013/0024079 | A1* | 1/2013 | Sekiya | F16H 61/32 |
| | | | | 701/51 |
| 2016/0053885 | A1* | 2/2016 | Noto | F16H 61/0202 |
| | | | | 74/473.12 |
| 2018/0066965 | A1* | 3/2018 | Shiratori | G01D 5/2497 |

* cited by examiner

SHIFT RANGE CONTROL DEVICE

CROSS REFERENCE TO RELATED APPLICATION

The present application is a continuation application of International Patent Application No. PCT/JP2018/46557 filed on Dec. 18, 2018, which designated the United States and claims the benefit of priority from Japanese patent application No. 2018-7010 filed on Jan. 19, 2018. The entire disclosures of both of the above applications are incorporated herein by reference.

FIELD

The present disclosure relates to a shift range control device.

BACKGROUND ART

Conventionally, a shift range control device is proposed for switching a shift range by controlling driving of a motor. For example, the driving of a motor is controlled based on detection values of an encoder and an output shaft sensor.

SUMMARY

According to the present disclosure, a shift range control device is provided for controlling a shift range switching system, which switches a shift range of a vehicle by controlling driving of a motor. The shift range control device comprises a motor angle calculation unit, an output shaft signal acquisition unit, an abnormality determination unit, a target angle setting unit and a drive control unit. The motor angle calculation unit is configured to acquire a motor rotation angle signal corresponding to a rotational position of the motor from a motor rotation angle sensor, which detects a rotation of the motor, and calculating a motor angle based on the motor rotation angle signal. The output shaft signal acquisition unit is configured to acquire an output shaft signal corresponding to a rotational position of the output shaft from an output shaft sensor, which detects a rotational position of an output shaft rotated by the rotation of the motor. The abnormality determination unit is configured to determine an abnormality of the output shaft sensor. The target angle setting unit is configured to set a target rotation angle corresponding to a target shift range. The drive control unit is configured to control the driving of the motor such that the motor angle attains the target rotation angle.

BRIEF DESCRIPTION OF THE DRAWINGS

The features and advantages of the present disclosure will become more apparent from the following detailed description made with reference to the accompanying drawings. In the drawings.

DETAILED DESCRIPTION OF THE EMBODIMENT

Embodiment

Figure 1:
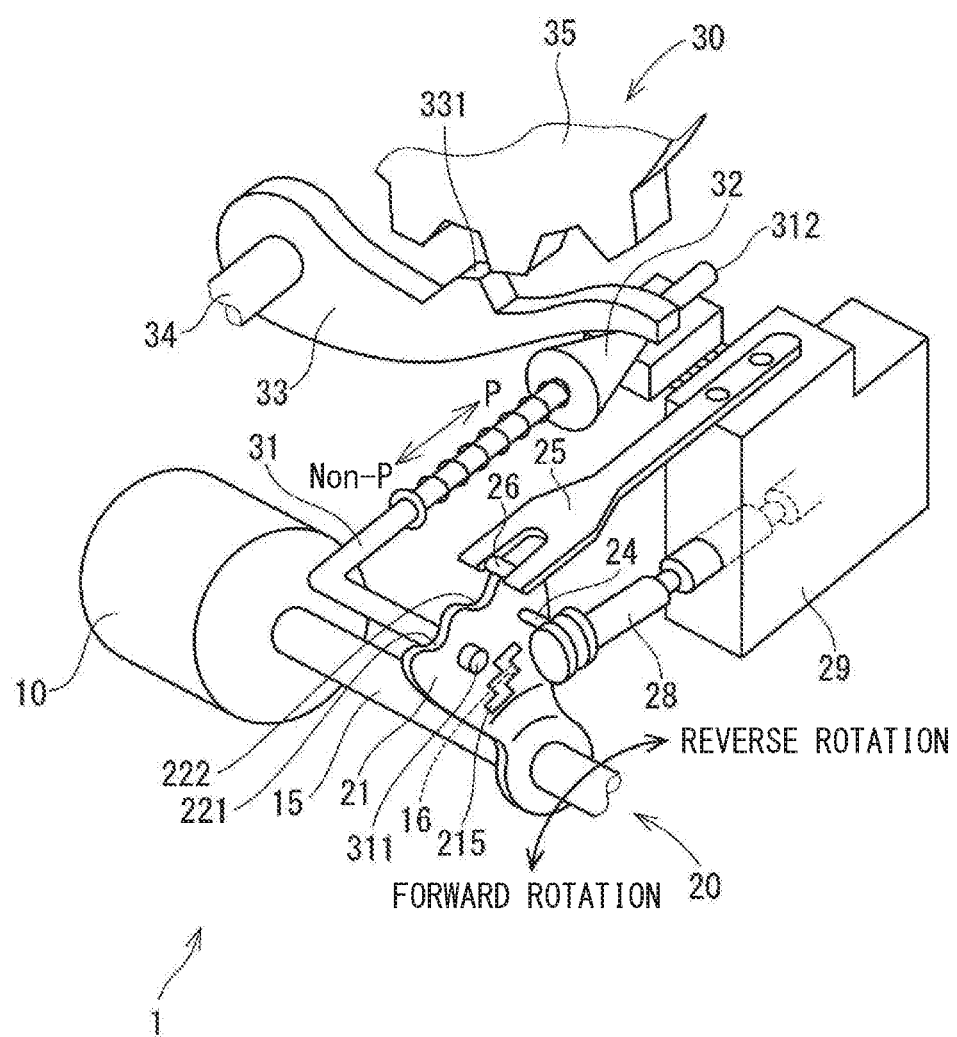
FIG. 1 is a perspective view showing a shift-by-wire system according to one embodiment.
Figure 2:
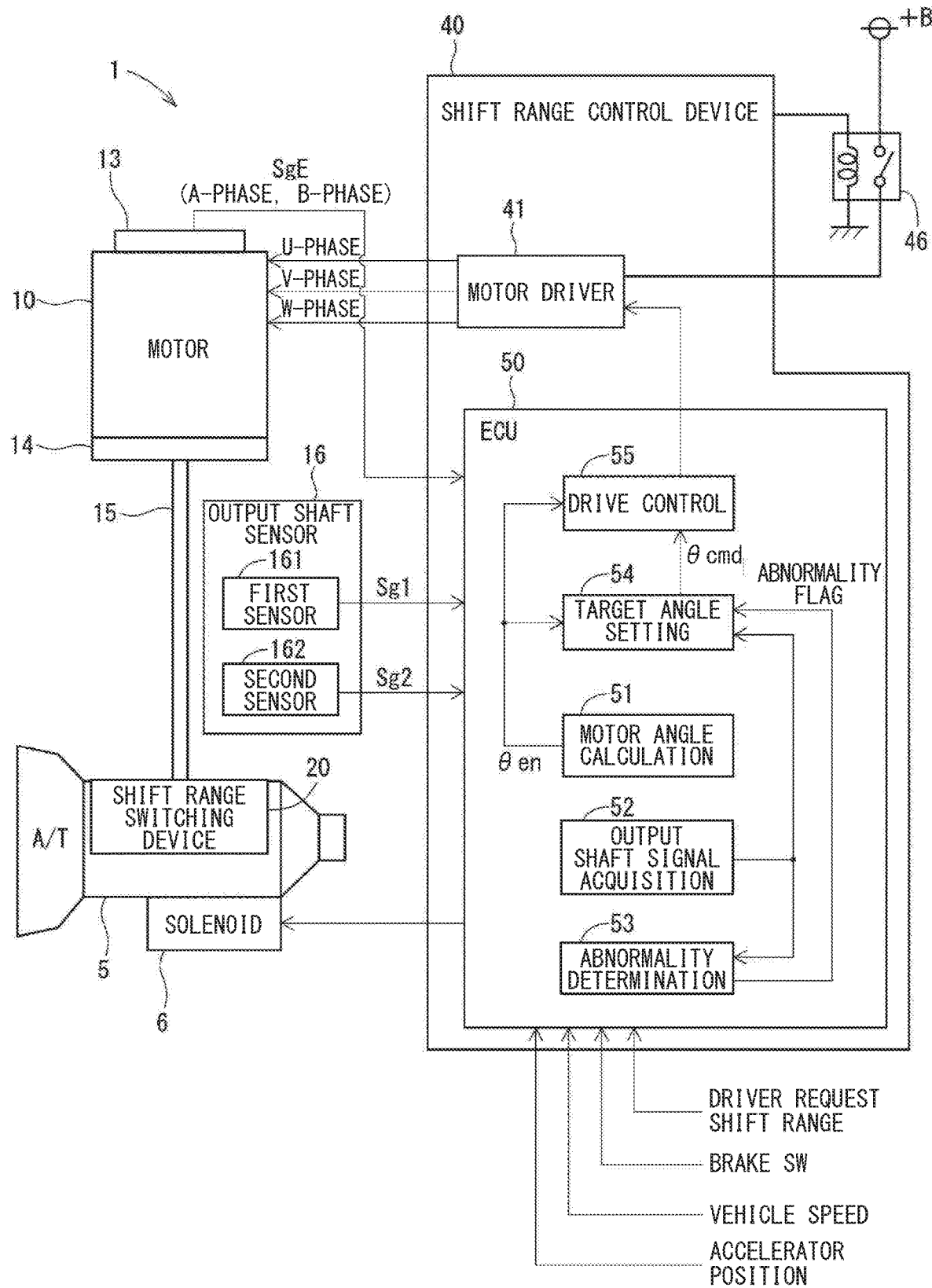
FIG. 2 is a block diagram generally showing a configuration of the shift-by-wire system according to the embodiment.

A shift range control device will be described in detail below with reference to the drawings. A shift range control device according to one embodiment is shown in FIG. 1 to FIG. 6. As shown in FIG. 1 and FIG. 2, a shift-by-wire system 1 as a shift range switching system for an automatic transmission 5 of a vehicle includes a motor 10, a shift range switching mechanism 20, a parking lock mechanism 30, a shift range control device 40 and the like. The motor 10 is rotatable with power supplied from a battery which is installed in a vehicle (not shown) and functions as a drive source of the shift range switching mechanism 20. Although the motor 10 of the present embodiment is a switched reluctance (SR) motor, any motor such as a DC brushless motor of a permanent magnet type may be used.

As shown in FIG. 2, an encoder 13 as a motor rotation angle sensor detects a rotation position of a rotor (not shown) of the motor 10. The encoder 13 is a magnetic type rotary encoder, for example, and includes a magnet rotating integrally with the rotor, a Hall IC for detecting magnetism of the magnet, or the like. The encoder 13 outputs A-phase and B-phase pulse signals for each predetermined angle in synchronism with the rotation of the rotor. Hereinafter, the signal output from the encoder 13 is referred to as a motor rotation angle signal SgE. A speed reducer 14 is provided between a motor shaft of the motor 10 and an output shaft 15 and transmits the rotation of the motor 10 to the output shaft 15 after speed reduction. The rotation of the motor 10 is thus transmitted to the shift range switching mechanism 20.

An output shaft sensor 16 has a first sensor unit 161 and a second sensor unit 162, and detects a rotation position of the output shaft 15. The output shaft sensor 16 according to the present embodiment is a magnetic sensor that detects a change in the magnetic field of a target 215 (refer to FIG. 1) provided on a detent plate 21, which is a rotation member described later. The output shaft sensor 16 is attached to a position where the magnetic field of the target 215 is detectable. In the figure, the first sensor unit 161 is labeled as a first sensor and the second sensor unit 162 is labeled as a second sensor.

The sensor units 161 and 162 are MR sensors having magneto-resistive elements (MR elements), which detect changes in the magnetic field of the target 215. The first sensor unit 161 detects a magnetic field corresponding to the rotation position of the target 215, and outputs an output shaft signal Sg1 to an ECU 50 described later. The second sensor unit 162 also detects a magnetic field corresponding to the rotation position of the target 215, and outputs an output shaft signal Sg2 to the ECU 50. The output shaft sensor 16 of the present embodiment includes two sensor units 161 and 162, and independently transmits the output shaft signals Sg1 and Sg2 to the ECU 50. That is, the output shaft sensor 16 has a double system.

As shown in FIG. 1, the shift range switching mechanism 20 includes a detent plate 21, a detent spring 25 as a biasing member, and the like, and transmits a rotational driving force output from the speed reducer 14 to a manual valve 28 and the parking lock mechanism 30. The detent plate 21 is fixed to the output shaft 15 and driven by the motor 10. In the present embodiment, a direction in which the detent plate 21 is away from a base of the detent spring 25 is defined as a forward rotation direction and a direction approaching the base portion is defined as a reverse rotation direction.

The detent plate 21 has a pin 24 protruding in parallel with the output shaft 15. The pin 24 is connected to the manual valve 28. As the detent plate 21 is driven by the motor 10, the manual valve 28 reciprocates in an axial direction. That is, the shift range switching mechanism 20 converts the rotational movement of the motor 10 into a linear movement and transmits the linear movement to the manual valve 28. The manual valve 28 is provided to a valve body 29. The reciprocating movement of the manual valve 28 in the axial direction switches hydraulic pressure supply paths to a hydraulic clutch (not shown) to switch an engagement state of the hydraulic clutch, so that the shift range is switched.

Two recess portions 221 and 222 are provided on a peripheral portion, that is, detent spring 25 side, of the detent plate 21. In the present embodiment, one side closer to a base of the detent spring 25 is referred to as the recess portion 222, and the other side away from the base of the detent spring 25 is referred to as the recess portion 221. In the present embodiment, the recess portion 221 corresponds to a parking (P) range, and the recess portion 222 corresponds to a Non-P range, which is other than the P range.

The detent spring 25 is a resiliently deformable plate-like member provided with the detent roller 26 at a tip end. The detent roller 26 is an engaging member. The detent spring 25 biases the detent roller 26 toward a rotation center of the detent plate 21, radially inward. When a predetermined or more rotating force is applied to the detent plate 21, the detent spring 25 elastically deforms, and the detent roller 26 moves between the recess portions 221 and 222. When the detent roller 26 is fitted into any one of the recess portions 221 and 222, a swing motion of the detent plate 21 is regulated, the axial position of the manual valve 28 and a state of the parking lock mechanism 30 are determined, and the shift range of the automatic transmission 5 is fixed. The detent roller 26 fits into the recess portion 222 when the shift range is the Non-P range, and fits into the recess portion 221 when the shift range is the P range. In the present embodiment, portions into which the detent roller 26 fits by the aid of a spring force of the detent spring 25 in accordance with the shift range is the bottom of the recess portions 221 and 222.

The parking lock mechanism 30 includes a parking rod 31, a conical member 32, a parking lock pawl 33, a shaft 34 and a parking gear 35. The parking rod 31 is generally L-shaped, and one end 311 side is fixed to the detent plate 21. The conical member 32 is provided to the other end 312 side of the parking rod 31. The conical member 32 is formed so as to contract toward the other end 312 side. When the detent plate 21 pivots in the reverse rotation direction, the conical member 32 moves in a P direction.

The parking lock pawl 33 is provided to abut on a conical surface of the conical member 32 and pivot about the shaft 34. On the parking gear 35 side of the parking lock pawl 33, a protrusion portion 331 is provided to be engageable with the parking gear 35. When the detent plate 21 rotates in the reverse rotation direction and the conical member 32 moves in the P direction, the parking lock pawl 33 is pushed up so that the protrusion portion 331 is engaged with the parking gear 35. On the contrary, when the detent plate 21 rotates in the forward rotation direction and the conical member 32 moves in a Non-P direction, the protrusion portion 331 is released from engagement with the parking gear 35.

The parking gear 35 is provided on an axle (not shown) to be capable of engagement with the protrusion portion 331 of the parking lock pawl 33. When the parking gear 35 and the protrusion portion 331 are engaged with each other, the rotation of the axle is restricted. When the shift range is the Non-P range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an ECU 50 and the like. The motor driver 41 outputs a drive signal related to energization of each phase (U-phase, V-phase, W-phase) of the motor 10. A motor relay 46 is provided between the motor driver 41 and a battery +B. The motor relay 46 is turned on while a start switch of a vehicle, such as an ignition switch, is turned on, so that power is supplied to the motor 10 side. The motor relay 46 is turned off when the start switch is turned off, and the supply of the electric power to the motor 10 side is cut off. In addition, with on/off control of the motor relay 46, power supply or cut-off to the motor 10 is switched.

The ECU 50 is configured mainly by a microcomputer and includes a CPU, a ROM, a RAM, an I/O, a bus line for connecting those configurations, and so on. Each processing executed by the ECU 50 may be software processing or may be hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The ECU 50 is configured to control the switching of the shift range by controlling driving of the motor 10 based on a driver-requested shift range, a signal from a brake switch, a vehicle speed and the like. The ECU 50 is configured to further control the driving of transmission hydraulic pressure control solenoids 6 based on the vehicle speed, an accelerator position, the driver-requested shift range and the like. By controlling the transmission hydraulic pressure control solenoids 6, the shift stage is controlled. The transmission hydraulic pressure control solenoids 6 are provided in number in correspondence to the number of the shift ranges and the like. In the present embodiment, one ECU 50 controls the driving of the motor 10 and the solenoids 6. However, the ECU 50 may be divided into a motor ECU for the motor control and an AT-ECU for the solenoid control. Hereinafter, drive control of the motor 10 will be mainly described.

The ECU 50 includes a motor angle calculation unit 51, an output shaft signal acquisition unit 52, an abnormality determination unit 53, a target angle setting unit 54, a drive control unit 55, and the like. These functional units of the ECU 50 may be provided as software processing performed by program execution or hardware processing performed by hard-wired circuits. The motor angle calculation unit 51 is configured to count pulse edges of an A-phase signal and a B-phase signal based on the motor rotation angle signal SgE acquired from the encoder 13, and calculate an encoder count value θen. The encoder count value θen is a value corresponding to the rotation position of the motor 10 and corresponds to a motor angle.

The output shaft signal acquisition unit 52 is configured to acquire an output shaft signals Sg1 and Sg2 from the output shaft sensor 16. The abnormality determination unit 53 is configured to determine whether the output shaft sensor 16 is abnormal. In addition, abnormality monitoring about the encoder 13 is separately performed. In the present embodiment, it is assumed that the encoder 13 is normal.

The target angle setting unit 54 is configured to sets a target count value θcmd, which is a command value for stopping the motor 10, based on a target shift range and the output shaft signals Sg1 and Sg2. In the present embodiment, the target count value θcmd corresponds to the target rotation angle. The drive control unit 54 is configured to control the driving of the motor 10 by a feedback control or the like so that the encoder count value θen attains the target count value θcmd. Details of the drive control for the motor 10 are not limited in particular.

Figure 3:
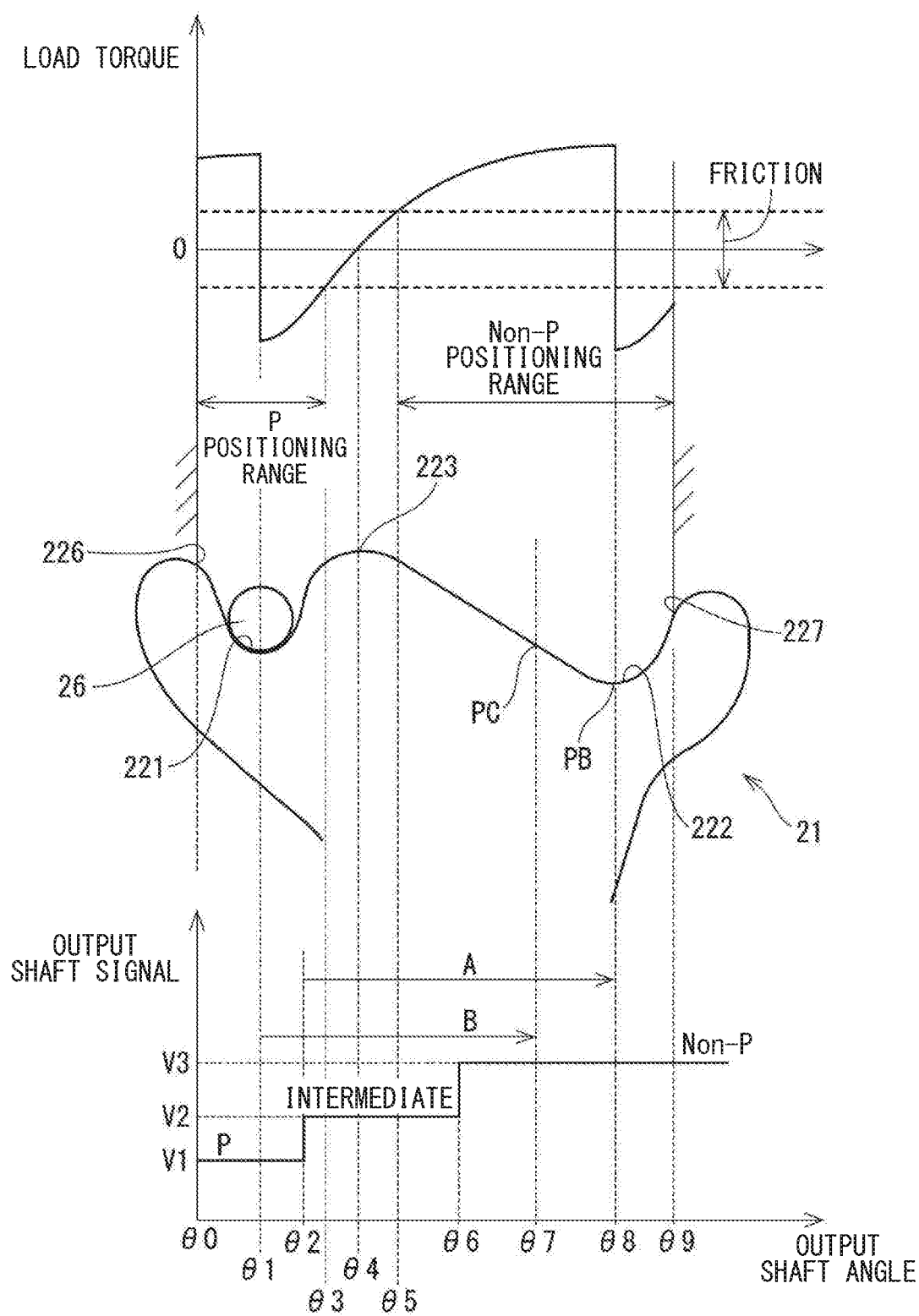
FIG. 3 is an explanatory diagram illustrating a detent plate and a detent roller according to the embodiment, and a load torque and an output shaft signal according to a position of the detent roller.

In FIG. 3, the top part shows a load torque, the middle part shows the detent plate 21 and the detent roller 26, and the bottom shows the output shaft signal. The output shaft sensor 16 of the present embodiment outputs three-stage values of a value V1 corresponding to the P range, a value V3 corresponding to the Non-P range, and an intermediate value V2 as the output shaft signals Sg1 and Sg2. The values V1, V2 and V3 to which the output shaft signals Sg1 and Sg2 change possibly are discrete changing in steps. Further, a difference between the value V1 and the value V2, a difference between the value V2 and the value V3 are set to be sufficiently large, as compared with the resolution and the sensor error. As described above, in the present embodiment, the value of the output shaft signals Sg1 and Sg2 changes stepwise. It is noted that, in the present embodiment, the output shaft signals Sg1 and Sg2 are switched to different values to such an extent that the value cannot be regarded as continuous with the rotation of the output shaft 15, which is assumed to be the stepwise change. The difference between the value V1 and the value V2 and the difference between the value V2 and the value V3 may be equal or different.

Here, the output shaft angle when the detection value of the output shaft sensor 16 switches from the value V1 to the value V2 or from the value V2 to the value V1 is assumed to be an angle θ2. The output shaft angle when the detection value of the output shaft sensor 16 switches from the value V2 to the value V3 or from the value V3 to the value V2 is assumed to be an angle θ6. The output shaft signals Sg1 and Sg2 change in the same manner except for errors and the like in a normal state. For this reason, the output shaft signal Sg2 is appropriately omitted for simplicity.

When the detent roller 26 is located at the bottom, that is, lowest position, of the recess portion 221, the output shaft angle is assumed to be an angle θ1. When the detent roller 26 is located at the top, that is, highest position, of the protrusion portion 223, the output shaft angle is assumed to be an angle θ4. When the detent roller 26 is located at the bottom of the recess portion 222, the output shaft angle is assumed to be an angle θ8. Further, when the detent roller 26 is rotated until it comes into contact with a wall portion 226, which is a rotation limit position on the P range side, the output shaft angle is assumed to be an angle θ0. When the detent roller 26 is rotated until it comes into contact with a wall portion 227, which is a rotation limit position on the Non-P range side, the output shaft angle is assumed to be an angle θ9. Actually, the angles θ0 and θ9 are shifted inward according to the size of the detent roller 26, but the details are omitted here.

Hereinafter, an operation of the present embodiment will be described assuming that the shift range is switched from the P range to the Non-P range. An operation at the time of switching from the Non-P range to the P range is similar. When switching the shift range from the P range to the Non-P range, the detent roller 26 is moved from the recess portion 221 to the recess portion 222. In FIG. 3, the bottom of the recess portion 222 where the detent roller 26 fits in when the range switching is completed is indicated as PB. A center of the recess portion range described later is indicated as PC. The load torque shown in the top part of FIG. 3 is a torque applied to the detent roller 26 by the spring force of the detent spring 25. The torque is assumed to be positive and negative in case of the same direction as and opposite direction to the torque applied by the rotation of the motor 10.

The load torque is negative when the detent roller 26 comes out of the state of being fitted in the recess portion 221 and moves to the protrusion portion 223 by the rotation of the motor 10. Further, the load torque approaches to zero as the detent roller 26 moves toward the top of the protrusion portion 223, and the load torque becomes zero when the detent roller 26 is located at the top of the protrusion portion 223.

When the detent roller 26 passes through the top of the protrusion portion 223, the load torque is in the same direction as the torque of the motor 10 and the load torque becomes positive. The load torque then increases until the detent roller 26 falls in the center of the recess portion 222. When the detent roller 26 fits into the recess portion 222, the polarity of the load torque is reversed. That is, the load torque changes according to the output shaft angle. On the other hand, the motor friction is substantially constant irrespective of the output shaft angle.

If the load torque due to the spring force of the detent spring 25 is larger than the friction generated by the motor 10 or the like, it is possible to move the detent roller 26 into one of the recess portions 221 and 222 when the motor 10 is turned off. That is, when the output shaft angle is larger than the angle θ5, the detent roller 26 can be moved into the recess portion 222 by the spring force of the detent spring 25. When the output shaft angle is smaller than the angle θ3, the detent roller 26 can be moved into the recess portion 221 by the spring force of the detent spring 25. In the present embodiment, an angular range in which the output shaft angle is equal to or larger than the angle θ0 and smaller than the angle θ3 is referred to as a P positioning range, and an angular range in which the output shaft angle is larger than the angle θ5 and equal to or smaller than the angle θ9 is referred to as a Non-P positioning range. Here, the positioning range is the angular range in which the detent roller 26 is returned to one of the recess portions 221 and 222 by the spring force of the detent spring 25 when the motor 10 is turned off. In the present embodiment, the shape of the detent plate 21 is asymmetric, and especially in the recess portion, the center of the positioning range and the bottom are different. By shaping the detent plate 21 asymmetrically, the detent roller 26 can be made hard to move out of the recess portion 221.

In the present embodiment, the angle between the angle θ2, which is the output shaft position at which the output shaft signal Sg1 changes, and the angle θ8, which is the output shaft position when the detent roller 26 is fitted in the bottom of the recess portion 222, is set as a correction value A. By correcting the target count value θcmd based on the encoder count value Den and the correction value A at the timing when the output shaft signal Sg1 switches from the value V1 to the value V2, it is possible to rotate the motor 10 appropriately to the position where the detent roller 26 fits into the recess portion 222. If the detent roller 26 is fitted in the recess portion 222, the output shaft 15 does not move even if the motor 10 is turned off.

If the target count value θcmd is corrected based on the erroneous signal and set to a position closer to the front side than the positioning range, that is, smaller than the value θ0, because of an abnormality occurring in the output shaft sensor 16, the range switching may not be performed. Further, if the target count value θcmd is corrected based on the erroneous signal and set to a position deeper than the wall 227, that is, larger than the value θ9, it is likely that the detent roller 26 collides with the wall 227 and the shift range switching mechanism 20 is damaged.

Therefore, in the present embodiment, if the output shaft sensor 16 is normal, the target count value θcmd is corrected based on the detection value of the output shaft sensor 16. On the other hand, when the abnormality of the output shaft sensor 16 is detected, the motor 10 is driven targeting the angle θ7 which is an intermediate position of the positioning range for the Non-P range. In the present embodiment, in case of the abnormality in the output shaft sensor 16, the angle between the angle θ1 and the angle θ7, which is the output shaft position when the detent roller 26 is fitted in the recess portion 221 before the range switching, is set as the initial value B. By rotating the motor 10 by the initial value B, the motor 10 is stopped at the timing when the detent roller 26 is within the positioning range. In this case, although there is a possibility that the output shaft 15 rotates after the motor 10 is turned off, at least the shift range switching operation is guaranteed and a limp-home traveling can be ensured. The correction value A and the initial value B are values corresponding to the count number of the encoder 13.

Figure 4:
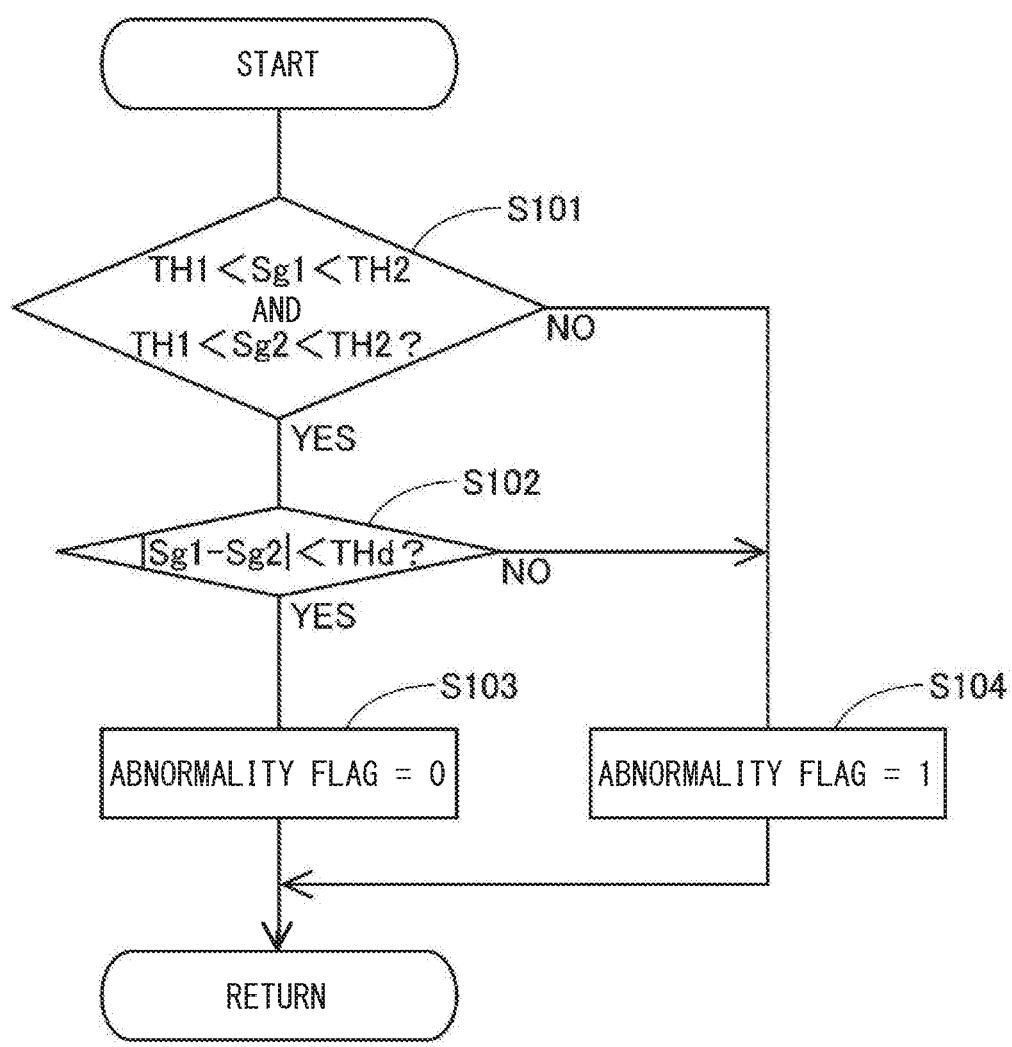
FIG. 4 is a flowchart showing abnormality check processing according to the embodiment.

Abnormality determination according to the present embodiment will be described with reference to the flowchart shown in FIG. 4, assuming that this function is performed by software processing the ECU 50. This processing is executed by the abnormality determination unit 53 at a predetermined cycle. Hereinafter, each step in the following processing is simply indicated as a symbol S.

In S101, the abnormality determination unit 53 checks whether both output shaft signals Sg1 and Sg2 are within respective normal ranges, which may be the same. Specifically, when the output shaft signals Sg1 and Sg2 are larger than a normal lower limit value TH1 and smaller than a normal upper limit value TH2, it is determined that the output shaft signals are within the normal range. When it is determined that at least one of the output shaft signals Sg1 and Sg2 is not within the normal range (S101: NO), the processing proceeds to S104. In case it is determined that the output shaft signals Sg1 and Sg2 are within the normal range (S101: YES), the processing proceeds to S102.

In S102, the abnormality determination unit 53 further checks whether an absolute value of a difference between the first output shaft signal Sg1 and the second output shaft signal Sg2 is smaller than a difference abnormality determination threshold value THd. In case it is determined that the absolute value of the difference between the first output shaft signal Sg1 and the second output shaft signal Sg2 is equal to or larger than the difference abnormality determination threshold value THd (S102: NO), it is determined that there is a difference abnormality in the output shaft signals Sg1 and Sg2. In this case, the processing proceeds to S104. In case it is determined that the absolute value of the difference between the first output shaft signal Sg1 and the second output shaft signal Sg2 is smaller than the difference abnormality determination threshold THd (S102: YES), the processing proceeds to S103.

In S103, the abnormality determination unit 53 determines that no abnormality has occurred in the output shaft sensor 16, and resets an abnormality flag. In S104, the abnormality determination unit 53 determines that an abnormality has occurred in the output shaft sensor 16, and sets an abnormality flag. In the figure, a state where the abnormality flag is set is assumed to be "1," and a state where it is not set is assumed to be "0."

Figure 5:
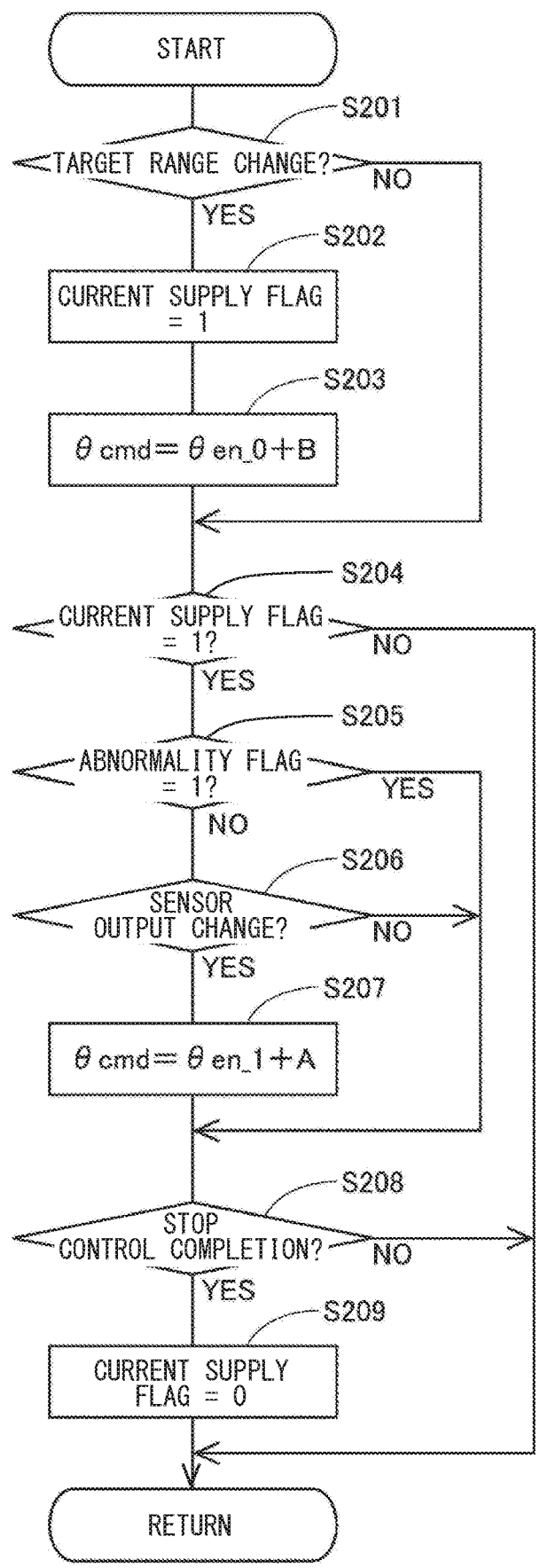
FIG. 5 is a flowchart showing target angle setting processing according to the embodiment.

Target angle setting processing in the present embodiment will be described with reference to the flowchart shown in FIG. 5. This processing is executed by the ECU 50 at a predetermined cycle. In S201, the ECU 50 checks whether the target shift range has been changed. In case it is determined that the target shift range has not been changed (S201: NO), the processing proceeds to S204. In case it is determined that the target shift range has been changed (S201: YES), the processing proceeds to S202. Here, it is assumed that the shift range is switched from the P range to the Non-P range.

In S202, the ECU 50 sets a current supply flag. When the current supply flag is set, energization of the motor 10 is started, and the motor 10 is driven so that the detent roller 26 moves to the recess portion, which corresponds to the target shift range.

In S203, the target angle setting unit 54 sets the target count value θcmd to a value determined by adding the initial value B to the current encoder count value θen_0 (see equation (1)). The initial value B is the count number of the encoder 13 corresponding to the angle down to the center of the positioning range of the recess portion 222 corresponding to the Non-P range which is the range after switching. In this example, θen_0+B corresponds to a second target value. That is, the second target value is a value determined by adding the angle between the bottom of the recess portion before the range switching and the center of the positioning range to the motor angle before the range switching. If the rotation direction is the reverse direction, the angle between the bottom of the recess portion before the range switching and the center of the positioning range may be set to a negative value, and positive or negative may be set according to the rotation direction.

$$\theta cmd = \theta en\_0 + B \quad (1)$$

In S204, the target angle setting unit 54 checks whether the current supply flag is set. In case it is determined that the current supply flag has not been set (S204: NO), this routine ends. In case it is determined that the current supply flag has been set (S204: YES), the processing proceeds to S204.

In S205, the target angle setting unit 54 checks whether the abnormality flag is set. In case it is determined that the abnormality flag is set (S205: YES), the processing proceeds to S208 without executing the processing of S206 and S207. In case it is determined that the current supply is not set (S205: NO), the processing proceeds to S206.

In S206, the target angle setting unit 54 checks whether the output of the output shaft sensor 16 has changed. Here, it is determined to be YES when the output shaft signals Sg1 and Sg2 change from the value V1 to the value V2. In case it is determined that the output of the output shaft sensor 16 has not changed (S206: NO), the processing proceeds to S208 so that the motor 10 is controlled with the target count value θcmd determined by the equation (1). In case it is determined that the output of the output shaft sensor 16 has changed (S206: YES), the processing proceeds to S207.

In S207, the target angle setting unit 54 corrects the target count value θcmd (see equation (2)). In the equation, θen_1 is the encoder count value when the output shaft signals Sg1 and Sg2 change from the value V1 to the value V2, and the correction value A is the count number of the encoder 13, which corresponds to the angle from the position where the output shaft signals Sg1 and Sg2 change to the bottom of the recess portion 222 corresponding to the Non-P range. In this example, θen_0+A corresponds to the first target value. That is, the first target value is determined by adding the angle between the position at which the value of the output shaft signal changes and the bottom of the recess portion corresponding to the target shift range to the motor angle at the timing of switching of the output shaft signal values. In case the rotation direction is opposite, the first target value is treated similarly to the case of the second target value.

$$\theta cmd = \theta en\_1 + A \quad (2)$$

In S208, the ECU 50 checks whether the stop control of the motor 10 has been completed. The stop control of the motor 10 is for stopping the motor 10 by supplying current to the fixed phase when the encoder count value θen enters the control range including the target count value θcmd. In case a predetermined time that is sufficient to stop the motor 10 has elapsed after the start of the fixed-phase current supply, it is determined that the stop control has been completed. In case it is determined that the stop control of the motor 10 has not been completed (S208: NO), the processing of S209 is not executed and this routine ends. In case it is determined that the stop control of the motor 10 has been completed (S208: YES), the processing proceeds to S209, and the current supply flag is reset.

Figure 6:
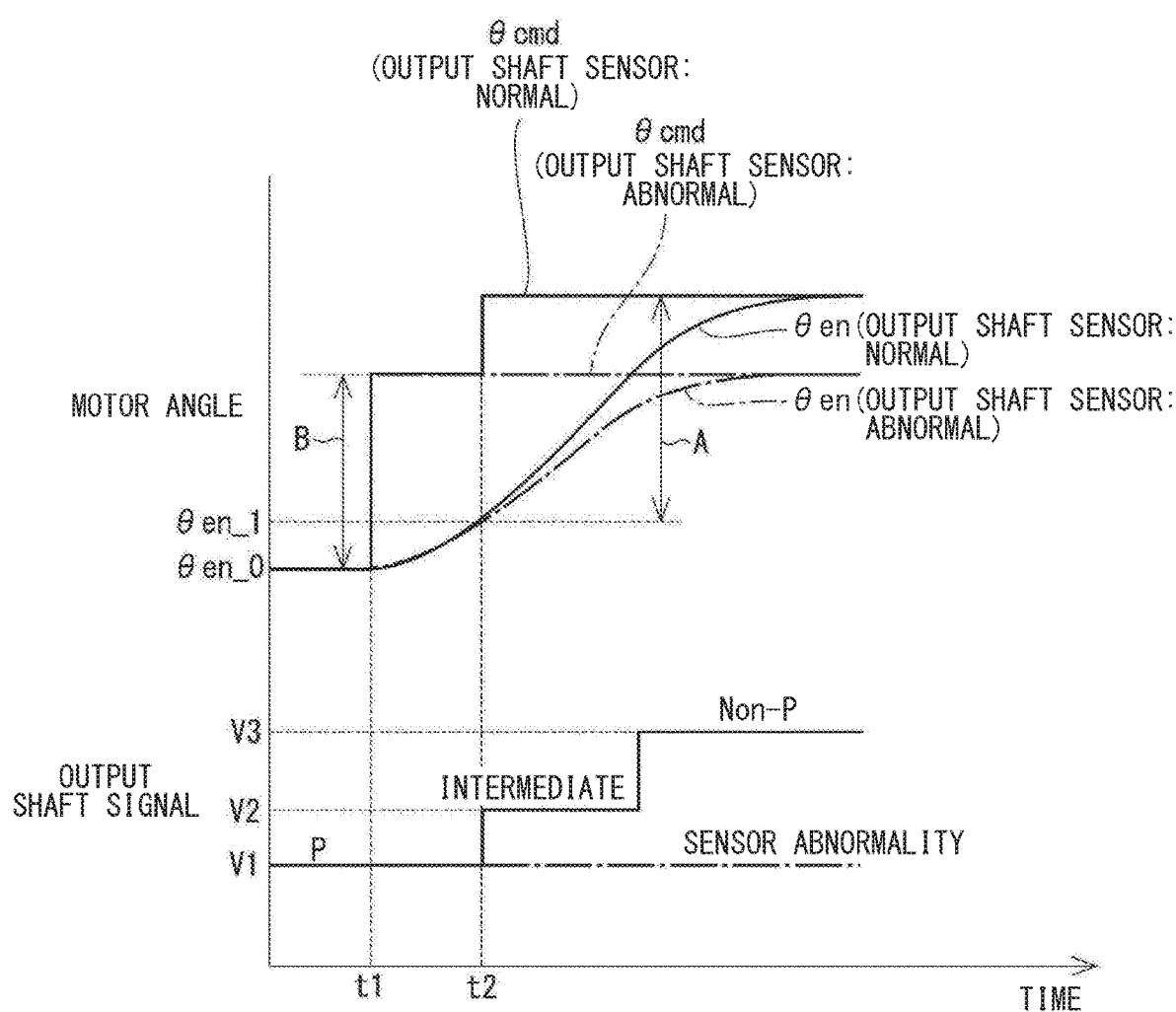
FIG. 6 is a time chart showing motor control operation according to the embodiment.

The motor control operation performed in the present embodiment will be described with reference to a time chart shown in FIG. 6. In FIG. 6, the horizontal axis is the common time axis, the motor angle is shown in the top part, and the output shaft signal is shown in the bottom part. The motor angle is indicated by a count value of the encoder 13. The operation is indicated by a solid line and a chain line, where the output shaft sensor 16 is normal and abnormal, respectively.

When the target shift range changes from the P range to the Non-P range at time t1, a value determined by adding the initial value B to the encoder count value θen_0 of the time before driving the motor is set as the target count value θcmd. When the motor 10 is rotated by the initial value B from the start of driving, the output shaft 15 rotates to the position where the detent roller 26 is at the center of the positioning range of the recess portion 222.

When the output shaft signal Sg1 switches from the value V1 to the value V2 at time t2, the value determined by adding the correction value A to the encoder count value θen_1 at the time t2 is set as the target count value θcmd if the output shaft sensor 16 is normal. When the motor 10 is rotated by the correction value A from the timing of switching of the output shaft signal Sg1 from the value V1 to the value V2, the output shaft 15 rotates to the position where the detent roller 26 fits into the bottom of the recess portion 222. Thereby, when the motor 10 is turned off, the rotation of the output shaft 15 and the vibration accompanying the rotation of the output shaft 15 can be suppressed.

In the present embodiment, the target count value θcmd is corrected at the timing when the output shaft signal Sg1 switches from the value V1 to the value V2. However, the target count value θcmd may be corrected a plurality of times during range switching, for example, by re-correcting the count value θcmd, at the timing when the output shaft signal Sg1 switches from the value V2 to the value V3.

On the other hand, in case that the output shaft sensor 16 is abnormal, the motor 10 is controlled such that the detent roller 26 is located at the center of the positioning range of the recess portion 222 without the correction using the detection value of the output shaft sensor 16. When the motor 10 is turned off after the stop control by the fixed-phase current supply is completed, the detent roller 26 is dropped to the bottom of the recess portion 222 by the spring force of the detent spring 25. Here, if the position where the motor 10 is rotated by the initial value B from the state where the motor 10 is stopped is near the center of the positioning range, it is highly likely that the detent roller 26 is sufficiently within the positioning range even in case it is slightly deviated from the center of the positioning range due to an error or the like. Therefore, the detent roller 26 can be reliably dropped into the bottom of the recess portion 222, and at least the range switching operation can be guaranteed. Thereby, the limp-home running performance is improved. Although FIG. 6 shows an abnormality in which the output shaft signal Sg2 is fixed at the value V1, the type of abnormality is not limited.

In particular, in the present embodiment, the center of the positioning range of the recess portion 222 is exemplified to be located closer to the rotational direction than the bottom of the recess portion 222, and the second target value is set closer to the rotational direction than the bottom of the recess portion 222. Therefore, the detent roller 26 does not rotate further beyond the bottom position of the recess portion 222 and does not contact the wall portion 227. Further, since the erroneous correction is not performed based on the output shaft sensor 16, it is possible to prevent the target count value θcmd from being set farther than the wall portion 227 and prevent the detent roller 26 from colliding with the wall portion 227.

As described above, the shift range control device of the present embodiment is configured to control the shift-by-wire system 1 that switches the shift range of the vehicle by controlling the driving of the motor 10, and includes the motor angle calculation unit 51, the output shaft signal acquisition unit 52, the abnormality determination unit 53, the target angle setting unit 54 and the drive control unit 55.

The motor angle calculation unit 51 is configured to acquire the motor rotation angle signal SgE corresponding to the rotation position of the motor 10 from the encoder 13 that detects the rotation of the motor 10, and calculate the encoder count value θen based on the motor rotation angle signal SbE. The output shaft signal acquisition unit 52 is configured to acquire the output shaft signals Sg2 and Sg2 corresponding to the rotation position of the output shaft 15 from the output shaft sensor 16 that detects the rotation position of the output shaft 15 to which the rotation of the motor 10 is transmitted. The abnormality determination unit 53 determines whether the output shaft sensor 16 is abnormal. The target angle setting unit 55 is configured to set the target count value θcmd corresponding to the target shift range. The drive control unit 56 is configured to control the drive of the motor 10 such that the encoder count value θen attains the target count value θcmd.

The target angle setting unit 54 is configured to set the target count value θcmd to the different values between the cases that the output shaft sensor 16 is normal and abnormal. Thus, even in case the abnormality occurs in the output shaft sensor 16, the shift range can be appropriately switched.

The shift-by-wire system 1 includes the detent plate 21, the detent roller 26 and the detent spring 25. The detent plate 21 has a plurality of recess portions 221 and 222 and the protrusion portion 223 between the recess portions 221 and 222, and is configured to rotate together with the output shaft 15. The detent roller 26 is engageable with the recess portions 221 and 222 according to the shift ranges. The detent spring 25 is configured to bias the detent roller 26 so that the detent roller 26 fits into the recess portion 221 or 222.

The target angle setting unit 54 is configured to set the target count value θcmd to be the first target value corresponding to the rotational position of the output shaft 15, at which the detent roller 26 fits in the bottom of the recess portions 221 and 222 corresponding to the target shift range, in case that the output shaft sensor 16 is normal. Further, the target angle setting unit 54 is configured to set the target count value θcmd to be the second target value corresponding to the rotational position of the output shaft 15, at which the detent roller 26 is within the positioning range in which the detent roller 26 is movable into the bottom of the recess portion 221 or 222 when the motor 10 is turned off, in case the output shaft sensor 16 is abnormal.

Accordingly, when the output shaft sensor 16 is normal, the motor 10 can be appropriately rotated to the position where the detent roller 26 is located at the bottom of the recess portion 221 or 222. Therefore, when the motor 10 is turned off, the output shaft 15 does not move, and the vibration can be suppressed when the motor is turned off. Even when the output shaft sensor 16 is abnormal, the detent roller 26 can be dropped to the bottom of the recess portion 221 or 222 as far as the detent roller 26 is within the positioning range. Therefore, the shift range switching operation can be guaranteed, and the limp-home driving performance is improved.

The target angle setting unit 54 is configured to set the second target value as the target count value θcmd when the target shift range is switched. When the output shaft sensor 16 is normal, the target count value θcmd is corrected to the first target value based on the output shaft signals Sg2 and Sg2. When the output shaft sensor 16 is abnormal, the target count value θcmd is maintained at the second target value. Thereby, the target count value θcmd can be set appropriately.

The positioning range is limited to the wall portions 226 and 227, in case that the load torque of the detent spring 25 is larger than the friction of the motor 10 and the one of the recess portions 221 and 222 has the wall portions 226 and 227 as the movement limit of the detent roller 26. Thus, even when the output shaft sensor 16 is abnormal, the detent roller 26 can be dropped into the recess portion 221 or 222 by the spring force of the detent spring 25. Further, the target count value θcmd is not set farther than the wall 226 or 227 in case the wall 226 or 227 is provided on one of the recess portions 221 and 222, the detent roller 26 is prevented from colliding the wall 226 or 227.

In particular, in the present embodiment, the detent plate 21 is shaped so that the bottom of the recess portion 222 and the center of the positioning range are different from each other, and the second target value is determined to correspond to the rotational position of the output shaft 15 attained when the detent roller 26 is located at the center of the positioning range. Here, the center of the positioning range is not strictly limited to the center, and may be a little different with some tolerances. In addition, in case there is play between the motor shaft and the output shaft, it is not clear where the motor shaft is located in the play at the time of starting the motor. For this reason, the second target value actually set has a certain error corresponding to the play of backlash at a maximum.

By setting the second target value at the center of the positioning range, the detent roller 26 can be reliably moved to the bottom of the recess portion 221 or 222 when the motor 10 is turned off.

Other Embodiment

In the above embodiment, the second target value is set at the center of the positioning range. However, the second target value may be off the center of the positioning range as long as it is within the positioning range.

In the above embodiment, the motor rotation angle sensor is the encoder. However, the motor rotation angle sensor need not necessarily be the encoder but may be any other devices such as a resolver. That is, the motor angle is not limited to the encoder count value but may be any value that can be converted into the motor angle.

In the above embodiment, the MR sensor is used as the output shaft sensor, and the output shaft signal changes in three stages. However, the output shaft signal may change in two stages, for example, a value corresponding to the P range and a value corresponding to the Non-P range. Further, the value of the output shaft signal may be switched in four or more stages.

The output shaft sensor may be any type, for example, a magnetic sensor other than the MR sensor. Further, for example, a device such as a potentiometer whose output value changes linearly according to the rotation of the output shaft may be used. Further, a switch type that turns on and off when the output shaft position corresponds to each range may be used.

Moreover, in the above embodiment, a double system is formed such that two independent output shaft signals are output from the output shaft sensor. However, the number of output shaft signals output from the output shaft sensor may be one or three or more. That is, the output shaft sensor may be a single system type or a triple or more multiplex system type. The motor rotation angle sensor may be a multiple system.

In the above embodiment, the rotation member is the detent plate, and the engagement member is the detent roller. However, the rotation member and the engagement member are not limited to the detent plate and the detent roller. These members may be any other type in regard to a shape and the like. Further, the shift range switching mechanism, the parking lock mechanism and the like may be different from those of the above embodiment.

In the above embodiment, the detent plate is provided with two recess portions. However, the number of recess portions is not limited to two but may be any number. For example, the number of recess portions of the detent plate may be four, so that the four recess portions may correspond to P (parking), R (reverse), N (neutral) and D (drive) ranges of the automatic transmission, respectively. In this case, since the recess portions corresponding to the R range and the N range have no walls on both sides, the positioning range is defined by the load torque of the detent spring and the motor friction.

In the above embodiment, the speed reducer is placed between the motor shaft and the output shaft. Although the details of the speed reducer are not described in the embodiment described above, it may be configured by using, for example, a cycloid gear, a planetary gear, a spur gear that transmits torque from a reduction mechanism substantially coaxial with the motor shaft to a drive shaft, or any combination of these gears. Alternatively, the speed reducer between the motor shaft and the output shaft may be omitted, or a mechanism other than the speed reducer may be provided.

The control circuit and method described in the present disclosure is implemented by a special purpose computer which is configured with a memory and a processor programmed to execute one or more particular functions embodied in computer programs of the memory. Alternatively, the control circuit and the method thereof described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A shift range control device for controlling a shift range switching system, which switches a shift range of a vehicle by controlling driving of a motor, the shift range control device comprising:
    a motor angle calculation unit configured to acquire a motor rotation angle signal corresponding to a rotational position of the motor from a motor rotation angle sensor, which detects a rotation of the motor, and calculating a motor angle based on the motor rotation angle signal;
    an output shaft signal acquisition unit configured to acquire an output shaft signal corresponding to a rotational position of the output shaft from an output shaft sensor, which detects a rotational position of an output shaft rotated by the rotation of the motor;
    an abnormality determination unit configured to determine an abnormality of the output shaft sensor;
    a target angle setting unit configured to set a target rotation angle corresponding to a target shift range; and
    a drive control unit configured to control the driving of the motor such that the motor angle attains the target rotation angle, wherein
    wherein the target angle setting unit is configured to set the target rotation angle to different values between a case that the output shaft sensor is normal and a case that the output shaft sensor is abnormal;
    the shift range switching system includes a rotation member having a plurality of recess portions and a protrusion portion between the recess portions and rotable with the output shaft, an engagement member engageable with the recess portion corresponding to a shift range, and a biasing member biasing the engagement member to be fitted in the recess portion;
    the target angle setting unit is configured to set the target rotation angle to a first target value corresponding to the rotational position of the output shaft, at which the engagement member is fitted in a bottom of the recess portion of the target shift range in case that the output shaft sensor is normal, and a second target value corresponding to the rotational position of the output shaft, at which the engagement member is located within a positioning range to be movable to the bottom of the recess portion in case that the output shaft sensor is abnormal, the positioning range being set to enable the engagement member to be fitted in the bottom of the recess portion by the biasing member when the motor is stopped; and
    the rotation member is a detent plate.

2. The shift range control device according to claim 1, wherein:
    the target angle setting unit is configured to set the target rotation angle to the second target value when the target shift range is switched, corrects the target rotation angle to the first target value based on the output shaft signal in case the output shaft sensor is normal, and maintains the target rotation angle at the second target value in case the output shaft sensor is abnormal.

3. The shift range control device according to claim 1, wherein:
    the positioning range is limited to a wall portion, which limits a movement of the engagement member at one side of the recess portion, under a state where a load torque of the biasing member is larger than a friction of the motor.

4. The shift range control device according to claim 1, wherein:
    the rotation member is shaped to have a bottom of the recess portion and a center of the positioning range at different positions; and
    the second target value corresponds to the rotational position of the output shaft at which the engagement member is located at the center of the positioning range.

5. The shift range control device according to claim 1, wherein:
    the output shaft signal includes a first output shaft signal and a second output shaft signal;
    the abnormality determination unit is configured to determine the abnormality of the output shaft sensor based on a check of whether both of the first and second output shaft signals are within respective normal ranges and a check of whether an absolute value of a difference between the first output shaft signal and the second output shaft signal is smaller than a difference abnormality determination threshold value.

6. The shift range control device according to claim 1, wherein a shape of the detent plate is asymmetric along a plane of the detent plate.

7. The shift range control device according to claim 1, wherein:
    the plurality of recess portions includes a first recess portion and a second recess portion; and
    a first depth of the first recess portion and a second depth of the second recess portion are different from each other.

8. The shift range control device according to claim 1, wherein:
    the plurality of recess portions includes a first recess portion and a second recess portion; and
    a first depth of the first recess portion is smaller than a second depth of the second recess portion; and
    the second recess portion is within the positioning range.

9. A shift range control device for controlling a shift range switching system, which switches a shift range of a vehicle by controlling driving of a motor and includes a rotation member having a plurality of recess portions and a protrusion portion between the recess portions and rotatable with the output shaft, an engagement member engageable with the recess portion corresponding to the shift range, and a biasing member biasing the engagement member to be fitted in the recess portion, the shift range control device being configured to execute processing of:

acquiring a motor rotation angle signal corresponding to a rotational position of the motor from a motor rotation angle sensor, which detects a rotation of the motor, and calculating a motor angle based on the motor rotation angle signal;

acquiring an output shaft signal corresponding to a rotational position of the output shaft from an output shaft sensor, which detects a rotational position of an output shaft rotated by the rotation of the motor;

determining whether the output shaft sensor is normal or abnormal;

setting a target rotation angle corresponding to a target shift range to different values between a case that the output shaft sensor is determined to be normal and a case that the output shaft sensor is determined to be abnormal; and driving the motor to attain the target rotation angle, wherein the processing of setting sets the target rotation angle to a first target value corresponding to the rotational position of the output shaft, at which the engagement member is fitted in a bottom of the recess portion of the target shift range in case that the output shaft sensor is determined to be normal, and a second target value corresponding to the rotational position of the output shaft, at which the engagement member is located within a positioning range to be movable to the bottom of the recess portion in case that the output shaft sensor is determined to be abnormal, the positioning range being set to enable the engagement member to be fitted in the bottom of the recess portion by the biasing member when the motor is stopped; and the rotation member is a detent plate.

10. The shift range control device according to claim 9, wherein:

the processing of setting sets the target rotation angle to the second target value when the target shift range is switched, corrects the target rotation angle to the first target value based on the output shaft signal in case the output shaft sensor is normal, and maintains the target rotation angle at the second target value in case the output shaft sensor is abnormal.

11. The shift range control device according to claim 10, wherein:

the positioning range is limited to a wall portion, which limits a movement of the engagement member at one side of the recess portion, under a state where a load torque of the biasing member is larger than a friction of the motor.

12. The shift range control device according to claim 10, wherein:

the processing sets the second target value to correspond to the rotational position of the output shaft at which the engagement member is located at a center of the positioning range, which is between a top of the protrusion portion and the bottom of the recess portion.

13. The shift range control device according to claim 9, wherein:

the output shaft signal includes a first output shaft signal and a second output shaft signal;

the shift range control device is configured to execute the processing of determining whether the output shaft sensor is normal or abnormal by performing a check of whether both of the first and second output shaft signals are within respective normal ranges and a check of whether an absolute value of a difference between the first output shaft signal and the second output shaft signal is smaller than a difference abnormality determination threshold value.

14. The shift range control device according to claim 9, wherein a shape of the detent plate is asymmetric along the plane of the detent plate.

15. The shift range control device according to claim 9, wherein:

the plurality of recess portions includes a first recess portion and a second recess portion; and a first depth of the first recess portion and a second depth of the second recess portion are different from each other.

16. The shift range control device according to claim 9, wherein:

the plurality of recess portions includes a first recess portion and a second recess portion; and a first depth of the first recess portion is smaller than a second depth of the second recess portion; and the second recess portion is within the positioning range.

* * * * *